Figure 1:
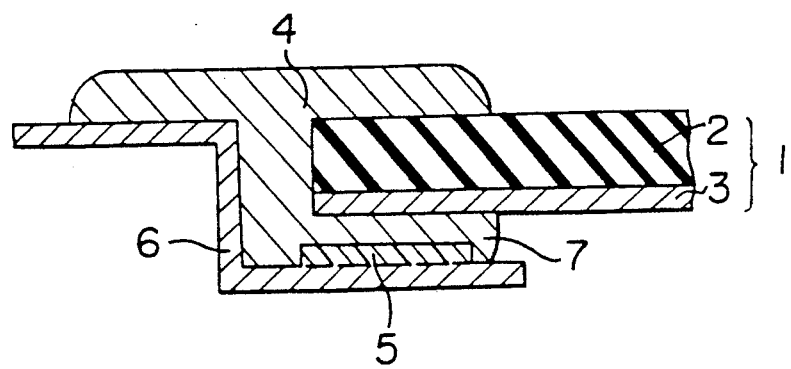

United States Patent [19]

Kojima et al.

[11] Patent Number: 4,999,147
[45] Date of Patent: Mar. 12, 1991

[54] METHOD FOR PRODUCING A GLAZING PRODUCT

[75] Inventors: Hiroaki Kojima, Yokohama; Toshio Ichiki, Kawasaki; Shigehito Shibata, Yokohama; Takeshi Harada, Yokohama; Eiji Hirano, Yokohama; Shoji Atsuta, Aichi, all of Japan

[73] Assignee: Asahi Glass Company, Ltd., Tokyo, Japan

[21] Appl. No.: 224,240

[22] Filed: Jul. 25, 1988

Related U.S. Application Data

[62] Division of Ser. No. 10,645, Feb. 4, 1987, abandoned.

[30] Foreign Application Priority Data

Jul. 10, 1986 [JP] Japan .................................. 61-160726

[51] Int. Cl.$^5$ ................. B29C 45/14; B29C 37/02
[52] U.S. Cl. ..................... 264/139; 264/252; 264/263
[58] Field of Search ............... 264/252, 139, 261, 262, 264/161, 247

[56]  References Cited

U.S. PATENT DOCUMENTS

| | | | |
|---|---|---|---|
| 4,543,283 | 9/1985 | Curtze et al. | 428/38 |
| 4,584,229 | 4/1986 | Bourelier et al. | 428/425.6 |
| 4,830,804 | 5/1989 | Weaver | 264/139 |

Primary Examiner—Jay H. Woo
Assistant Examiner—Jeremiah F. Durkin, II
Attorney, Agent, or Firm—Oblon, Spivak, McClelland, Maier & Neustadt

[57]  ABSTRACT

A process for making a glazing product which includes forming a gasket on a sheet of bilayer glass with a self healing transparent elastic plastic layer bonded to one side of the glass. A removable protective material is applied to the plastic layer. The assembly is placed in a mold cavity and a plastic material is injected into the mold cavity to form a gasket. The protective material is removed from the plastic layer after the gasket has formed.

4 Claims, 1 Drawing Sheet

METHOD FOR PRODUCING A GLAZING PRODUCT

This application is a division of application Ser. No. 07/010,645, filed on Feb. 4, 1987, now abandoned.

The present invention relates to a glazing product comprising a bilayer glass provided with a gasket, and a process for its production.

A laminated glass having an inorganic glass layer on one side and a transparent plastic layer on the other side is known as a bilayer glass suitable for a windshield for automobiles. For example, U.K. Patent No. 1,394,271, U.S. Pat. No. 4,232,080, U.K. Patent No. 1,576,394, Japanese Unexamined Patent Publication No. 13824/1985 and European Patents Nos. 133,090, 132,198, 131,523, 144,065 and 190,700 disclose a bilayer glass wherein a polyurethane-type transparent elastic plastic layer is provided on one side of an inorganic glass sheet or of a conventional laminated glass sheet i.e. a laminate of a pair of inorganic glass sheets with an associated interlayer. Further, U.K. Patent No. 1,555,144 or U.S. Pat. No. 4,242,403 discloses a bilayer glass wherein a transparent plastic material such as a polyethylene terephthalate (PET) film having a hard coating layer, is bonded by an adhesive resin to one side of a conventional laminated glass. Such a bilayer glass is used mainly for automobile windshields. In such a case, the bilayer glass is disposed so that the transparent plastic layer is located inside the car.

It has been common to provide a gasket along the periphery of a conventional reinforced inorganic glass sheet or laminated glass commonly employed as a glazing product for automobiles, and to attach it to an automobile window frame by a physical connecting method or by a bonding method by means of an adhesive. However, no detailed studies have been made on the method for attaching the above-mentioned bilayer glass. The present inventors have made a study on the method for attaching the bilayer glass to the window frame, and have found certain problems as described hereinafter. The primary purpose of the present invention is to solve such problems in the method for attaching the bilayer glass. However, it is also an object of the present invention to solve other problems relating to the bilayer glass itself in addition to such problems.

Heretofore, as a method for mounting an automobile glazing product to the window frame, it used to be most common to physically attach the glazing product by means of a gasket. However, in recent years, an adhesive bonding method has become popular as a highly reliable mounting method or in view of the productivity. The adhesive bonding method is a method in which the inorganic glass surface and the window frame are directly bonded by an adhesive, and it is usually required to increase the adhesive strength and to prevent a deterioration of the adhesive due to sun light by coating a ceramics coating material such as glass frits on the portion of the inorganic glass surface which is in contact with the adhesive. In such a case, it is common to employ a gasket for the purpose of sealing the edge of the window material. However, this gasket is not so strongly physically connected to the window frame as to provide adequate fixing strength for securely connecting the window material and the window frame. The fixing strength between the glazing product and the window frame is attained primarily by the adhesive strength of the above adhesive. Therefore, the inorganic glass surface and the window frame must be bonded with sufficiently high adhesive strength, and for this purpose, an adequately large bonding surface is required on the above-mentioned inorganic glass surface.

The most serious problem in attaching the above-mentioned bilayer glass to the window frame by the above described adhesive bonding method, is that adequately high bonding strength can not thereby be obtained. One of the reasons is that the transparent plastic layer of the bilayer glass is not necessarily bonded to the inorganic glass surface with adequately high adhesive strength. Further, when the transparent plastic layer has a multi-layered structure, the respective transparent plastic layers are not necessarily bonded to one another with adequately high bonding strength. Therefore, even when the transparent plastic layer surface and the window frame are bonded with sufficiently high adhesive strength, there is a possibility that interlayer separation takes place in the bilayer glass, and there is no assurance to say that the glazing product and the window frame are bonded with adequately high adhesive strength. Another reason is that, in many cases, the surface of the transparent plastic layer is made of a surface material having a low adhesive property, and it is difficult to adequately increase the bonding strength with the adhesive. The surface portion of the transparent plastic layer is, in many cases, made of a material having a relatively low adhesive property, such as a low adhesive cross-linked (thermosetting) polyurethane, a non-adhesion treated polyurethane or a hard coating layer, and thus has no adequate bonding strength with an adhesive. Accordingly, it is believed difficult to attach the bilayer glass to the window frame by the conventional adhesive bonding method for the above reasons. As a method for solving this difficulty, it is conceivable to remove the transparent plastic layer along the periphery of the bilayer glass and bond the exposed inorganic glass surface and the window frame by an adhesive. However, such a method is not only cumbersome, but also likely to bring about a possibility that the exposed inorganic glass surface does not bond to the adhesive with adequately high bonding strength. Thus, it is likely to be required to improve the adhesion, for instance, by applying a ceramics coating material to the exposed inorganic glass surface, which makes the method more cumbersome.

On the other hand, the bilayer glass itself has problems to be solved. The interface of the inorganic glass layer and the transparent plastic layer, is exposed at the side surface portion of the bilayer glass, and water, steam, a cleaning agent or any other liquid or gas attributable to deterioration, is likely to penetrate into the interface. Accordingly, the bonding strength at the interface tends to deteriorate, and whitening or separation of the interface is likely to result. Therefore, it is frequently required to seal the side surface of the bilayer glass. Such sealing may also be required in the case where the transparent plastic layer is removed along the periphery of the above bilayer glass. In particular, it is necessary to adequately seal the side surface especially when an adhesive which is likely to adversely affect the interface, is employed.

The present inventors have studied a possibility of covering the periphery of the bilayer glass with a gasket in order to solve the above problems. However, with conventional gasket materials commonly employed for physical connection, it is impossible to utilize the merit of the adhesive bonding method. In the case of a physical mounting method, the attaching operation is cumbersome, and since the gasket and the bilayer glass are merely in contact with each other and do not have high bonding strength, the reliability for the fixing strength is low. Besides, it is likely that a space is created between the bilayer glass and the gasket, and a liquid or gas is likely to penetrate into the space, whereby the reliability of the side surface sealing is not adequate. Accordingly, even when a bilayer glass to which such a gasket is attached, is bonded to the window frame by the adhesive bonding method, it is not possible to solve the problems existing between the gasket and the bilayer glass.

U.S. Pat. No. 4,543,283 discloses a glazing product comprising a bilayer safety glass obtained by bonding a PET film having a hard coating layer to an inorganic glass sheet by an adhesive resin, and a gasket made of a plastic formed by reaction and curing in situ along the periphery. The gasket is made of a plastic such as polyurethane formed by reaction injection molding. However, this glazing product and the method for its preparation has the following problems to be solved.

The bilayer safety glass is required to have a property to absorb an impact energy when a human body is thrown against it. For this purpose, the transparent plastic layer is required to be made of a material having high elasticity and large breaking elongation. The PET film has a relatively low elasticity and small breaking elongation (usually not higher than 50%). In the case of the above-mentioned bilayer safety glass wherein the PET film is employed, the impact energy is absorbed by the layer of an adhesive resin such as polyvinyl butyral. In order for the adhesive resin layer to effectively absorb the impact energy, the inorganic glass layer and the PET film must not be fixed to each other along their both sides. The gasket serves to fix the inorganic glass layer and the PET film to each other along the periphery of the bilayer safety glass. Thus, the gasket tends to reduce the desired property of the bilayer safety glass to absorb the impact energy.

On the other hand, the low elasticity of the PET film brings about a problem for the formation of a gasket. When a bilayer safety glass is placed in a mold for forming a gasket, a sealing member is provided in a mold to divide the peripheral portion of the bilayer safety glass along which a gasket is to be formed, from the rest of the bilayer glass, and to prevent leakage of the reaction-curable plastic material from the mold cavity for the gasket along the surface of the bilayer safety glass. This sealing member presses the PET film of the laminated safety glass, whereby a deformation or wrinkles are likely to form on the PET film. Since the PET film has a low elasticity, the deformation or wrinkles thus formed on the PET film, hardly disappear to restore the original smooth surface after the formation of the gasket. If the pressing force of the sealing member is reduced to solve this problem, there will be a difficulty in attaining the desired sealing. Accordingly, it has been difficult to solve this problem while securing the sealing efficiency.

The present inventors have conducted various studies with an aim to solve the above-mentioned problems involved in the attachment of the bilayer glass to the window frame by an adhesive bonding method. As a result, it has been found possible to solve the problems by using a bilayer glass having a transparent plastic layer having high elasticity and large elongation.

The present invention provides a glazing product comprising a bilayer glass composed of an inorganic glass layer and a self-healing transparent elastic plastic layer bonded to one side of the inorganic glass layer, and a gasket formed along the periphery of the bilayer glass, said gasket extending to cover the marginal edge surfaces of both the inorganic glass layer and the elastic plastic layer and being made of a plastic formed by reaction and curing on said marginal edge surfaces.

Further, the present invention provides a process for producing a glazing product, which comprises placing in a mold a bilayer glass composed of an inorganic glass layer and a self-healing transparent elastic plastic layer bonded to one side of the inorganic glass layer, to form a mold cavity for a gasket defined by the marginal edge surfaces of both the inorganic glass layer and the elastic plastic layer along the periphery of the bilayer glass and the inner surface of the mold, injecting into the mold cavity a plastic material mixture capable of being rapidly reacted and cured to form a plastic, and having the plastic material mixture reacted and cured to form a gasket. If necessary, a part or an entire portion of the surface of the plastic layer of the laminated glass other than the marginal edge surface for defining the mold cavity, is protected with a removable protective material, and the protective material is removed after the formation of the gasket.

Now, the present invention will be described in detail with reference to the preferred embodiments.

In the accompanying drawings, FIG. 1 is a partial cross-sectional view illustrating one embodiment of the glazing product of the present invention as attached to a window frame.

Figure 2:
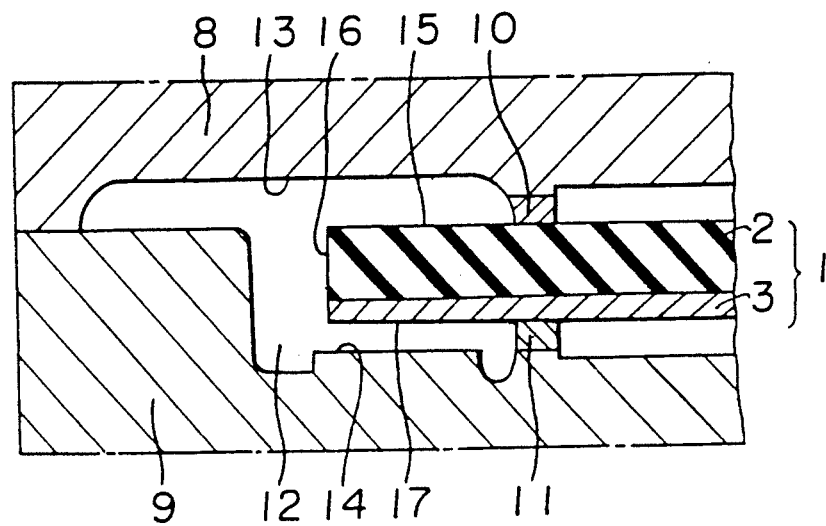

FIG. 2 is a partial cross-sectional view of a mold illustrating the process of the present invention.

The glazing product of the present invention is attached to a window frame by bonding the gasket to the window frame by an adhesive. The adhesive may be applied also to a portion other than the gasket, particularly to the surface of the transparent elastic plastic layer. However, the strength for the attachment is required to be provided mainly by the adhesion between the gasket and the window frame. The gasket is made of a plastic formed by reaction and curing along the periphery of the bilayer glass, and is thus firmly bonded to the bilayer glass. The material for the gasket may be selected from plastics which has high adhesion to the window frame. Thus, the gasket can be firmly bonded to both the bilayer glass and the window frame. Consequently, the bilayer glass is firmly connected to the window frame.

FIG. 1 is a partial cross-sectional view illustrating the portion of one embodiment of the glazing product of the present invention as attached to a window frame. The bilayer glass 1 comprises an inorganic glass layer 2 and a transparent elastic plastic layer 3. The gasket 4 is formed along the periphery of the bilayer glass 1 and extends to cover the marginal edge surfaces of both the inorganic glass layer and the elastic plastic layer. Namely, it covers the exterior surface (the upper surface in the Figure) and the side surface of the inorganic glass layer and the interior surface (the lower surface in the Figure) of the transparent elastic plastic layer. The gasket 4 is bonded to the window frame 6 by an adhesive 5.

The gasket 4 is required to cover at least the side surface of the peripheral portion of the bilayer glass 1 (including the side surfaces of the inorganic glass layer and the transparent elastic plastic layer). Preferably, it also covers the upper surface (the surface of the inorganic glass layer). However, it is usual to cover both the upper surface (the surface of the inorganic glass layer) and the lower surface (the surface of the transparent elastic plastic layer) as shown in the Figure. Basically, the cross-sectional shape is preferably a ]-shape covering the three surfaces. The illustrated gasket 4 has a flange to cover a part of the exterior surface of the window frame, in addition to the ]-shape portion. This flange covers the joint portion between the window frame and the ]-shape portion, and it effectively seals the joint portion and improves the outer appearance thereof. The interior end portion of the gasket is preferably provided with a projection 7 (FIG. 1) to prevent leakage of the adhesive between the gasket and the window frame. Further, the gasket is preferably provided with a recess to receive the adhesive 5. In the illustrated embodiment, the projection 7 at the end portion is formed by forming the recess. However, such a projection may be formed without providing a recess. The adhesive may be filled between the vertical portion of the window frame 6 and the gasket 4 in addition to the illustrated portion.

The glazing product of the present invention is not restricted to the one illustrated in the Figure. For instance, the bilayer glass may be treated for an improvement in the adhesion along the periphery which is brought in contact with the gasket. For example, it is possible to apply a ceramics coating material to the surface of the inorganic glass layer. In the present invention, the marginal edge surfaces of both the inorganic glass layer and the elastic plastic layer include such treated surfaces. Further, the interface between the inorganic glass layer and the transparent elastic plastic layer is not necessarily located at the side surface of the laminated glass so long as it is covered by the gasket. For example, the side edge of the transparent elastic plastic layer may be located inward from the side edge of the inorganic glass sheet to some extent. Namely, the interface may be present on the lower surface of the laminated glass (on the side where the transparent elastic plastic layer is located), so long as the interface is covered by the gasket.

The glazing product of the present invention makes high strength for attachment possible and at the same time, solves the problems of the bilayer glass itself. Namely, the interface of the inorganic glass layer and the transparent elastic plastic layer is certainly sealed along the side surface of the high layer glass, and at the same time, the transparent elastic plastic layer is prevented from separation from the inorganic glass surface. Further, it is bonded via the gasket, and the major portion of the adhesive is covered by the gasket which is usually opaque, whereby the deterioration of the adhesive due to sunlight, etc. can be prevented. Furthermore, the gasket may be colored with any desired color i.e. without being restricted to a black color, whereby it is possible to increase the attractiveness of the outer appearance and to reduce the heating due to the sunlight, etc to reduce the degradation. In addition, an advantageous effect can be brought about also in the handling of the bilayer glass. Namely, when a number of bilayer glass sheets are to be piled for stock, it is usually necessary to place a spacer between the adjacent bilayer glass sheets in order to avoid their adhesion i.e. the adhesion of the transparent elastic plastic layer of one sheet to the inorganic glass layer of the other sheet. According to the present invention, however, the gasket plays a role of the spacer, and the glazing products of the present invention can be piled without leading to such adhesion.

In the present invention, the bilayer glass may be of any type, so long as it has an inorganic glass layer and a transparent elastic plastic layer having a self-healing exposed surface. A typical bilayer glass is a bilayer glass comprising an inorganic glass sheet and a transparent elastic plastic layer formed on one side thereof, or a bilayer glass comprising a conventional laminated glass and a transparent elastic plastic layer formed on one side thereof. The latter has a structure such that a self-healing cross-linked polyurethane sheet or film is bonded, if necessary by an adhesive resin such as a thermoplastic polyurethane or polyvinyl butyral, to one side of a conventional laminated glass comprising a pair of inorganic glass sheets laminated with an interlayer of e.g. polyvinyl butyral, interposed therebetween. However, from the viewpoint of the light weight and economy, the former type bilayer glass using one sheet of an inorganic glass is preferred. A typical example of the former type bilayer glass has a structure in which a single- or multi-layered polyurethane sheet or film is bonded on one side of an inorganic glass sheet. The exposed surface of the polyurethane layer has a self-healing property and preferably also has a surface property such as a stain resistant property. As a polyurethane having such a surface, a cross-linked polyurethane is suitable. Further, in order to improve the stain resistance, a surface treatment may be conducted, for instance, by impregnating a polyfunctional acrylic or methacrylic addition polymerizable monomer to the surface, followed by polymerization with ultraviolet rays. The polyurethane layer is also required to have a mechanical property such as a penetration resistance, as required for the interlayer of the above-mentioned conventional laminated glass. This mechanical property can be attained by a thermoplastic polyurethane or a certain cross-linked polyurethane. In the case where the former thermoplastic polyurethane is employed, the transparent elastic plastic layer of the bilayer glass will have an at least two-layered structure i.e. the self-healing surface layer and this thermoplastic polyurethane layer. In the case where the latter cross-linked polyurethane is employed, if it has a self-healing property, the transparent elastic plastic layer may be composed solely of a single layer of this polyurethane. Cross-linked polyurethanes having such self-healing property and mechanical property are disclosed also in European Patent No. 190,700 (corresponding to U.S. patent application Ser. No. 825,545 filed on Feb. 3, 1986 now U.S. Pat. No. 4,683,171). Such a cross-linked polyurethane sheet or film may be bonded to the inorganic glass sheet, if necessary, by means of the above-mentioned adhesive resin. If the sheet or film has a high adhesive property, it may directly be bonded to the inorganic glass sheet. The inorganic glass sheet may be a reinforced or semi-reinforced inorganic glass sheet, and is usually processed for flexure. The thickness is usually from about 2 to about 6 mm, and the transparent plastic layer usually has an overall thickness of from about 0.2 to about 2 mm.

The glazing product of the present invention is preferably produced by the above-mentioned process. Namely, the bilayer glass is placed in a mold for forming a gasket, to form a mold cavity for the gasket, and a plastic material mixture is injected into this mold cavity, and reacted and cured to form the gasket. The mold cavity is a cavity defined by the marginal edge surfaces of both the inorganic glass layer and the plastic layer along the periphery of the bilayer glass and the inner surface of the mold. Thus, the gasket formed, extends to cover the marginal edge surfaces of both the inorganic glass layer and the elastic plastic layer along the periphery of the bilayer glass. The plastic material mixture is required to be rapidly reacted and cured to form a plastic. The rapid reaction and curing means that the plastic material mixture has such a reaction curable property that it can be removed as molded from the mold in about 5 to 6 minutes, preferably in about 2 to 3 minutes after the injection of the mixture into the mold cavity. The plastic material mixture is of the type which is curable by polymerization such as addition polymerization to form a high molecular weight product. Such a plastic material mixture is reacted and cured on the surface of the bilayer glass to form a gasket, whereby it is possible to accomplish strong bonding of the gasket to the bilayer glass.

A molding method to obtain a plastic molded product by rapidly reacting and curing a plastic material mixture in a mold, is called a reaction injection molding (RIM) method. The plastic material mixture is prepared usually by impingement mixing of at least two plastic materials immediately prior to the injection, and the mixture is injected into the mold by the pressure of the mixing. The plastic suitable for such reaction injection molding includes a polyurethane and an epoxy resin. The polyurethane is particularly preferred, since the polyurethane may be of the same type of the polyurethane as the preferred material for the transparent elastic plastic layer of the bilayer glass, and thus has a high adhesive property thereto, and the pressure and temperature in the mold cavity during the molding operation can be made relatively low, whereby the degradation or deformation of the transparent plastic layer can be minimized.

It is known to form a gasket along the periphery of an inorganic glass sheet by reaction injection molding or by usual injection molding, as disclosed, for example, in Japanese Unexamined Patent Publication No. 158481/1982, U.K. Patent No. 2,141,375 and U.S. Pat. Nos. 4,584,155 and 4,561,625. However, these prior art references do not disclose the formation of a gasket along the periphery of a bilayer glass. Further, in the case of a bilayer glass, the above known methods can not simply be applied because of the presence of the transparent elastic plastic layer. For example, by usual injection molding, the pressure or temperature in the mold cavity tend to be so high that the transparent elastic plastic layer is likely to undergo degradation, deformation or separation of the layer. The pressure in the mold cavity is preferably as low as possible. In the present invention, the pressure is preferably at most about 5 kg/cm$^2$, more preferably from 1 to 3 kg/cm$^2$. The molding temperature is preferably at most about 80° C., more preferably from about 40° to about 70° C., as the mold temperature. However, the temperature in the cavity may sometimes be higher than this temperature due to the generation of the reaction heat.

In view of the above molding conditions and desired bonding strength, the gasket material is preferably a polyurethane. When a polyurethane is to be formed by reaction injection molding, the starting materials basically comprise a high molecular weight active hydrogen compound, a chain extender and a polyisocyanate compound. As the high molecular weight active hydrogen compound, a polyol or polyamine having an average molecular weight of from 800 to 4000 per functional group (hydroxyl group and/or amino group) and an average number of functional groups per molecule of from about 2 to about 4, is suitable. Particularly preferred is a polyether polyol or a polyether polyol mixture having an average molecular weight per hydroxyl group of from about 1000 to about 3000 and an average number of hydroxyl groups per molecule of from about 2.0 to 3.5. Further, a polymer-dispersed polyol, i.e. so-called polymer polyol, may also be employed. As the chain extender, a polyol or polyamine having a molecular weight of at most about 400, particularly a bi-functional diol or diamine, is suitable. Particularly preferred is at least one chain extender selected from the group consisting of ethylene glycol, 1,4-butanediol and a diaminobenzene substituted by a lower alkyl group such an ethyl group or by a chlorine atom. As the polyisocyanate compound, an aromatic polyisocyanate or its modified product is suitable, and a modified product of diphenylmethane diisocyanate, particularly a carbodiimide-modified diphenylmethane diisocyanate or a prepolymer type modified-diphenylmethane diisocyanate, is preferred. Further, a non-modified diphenylmethane diisocyanate, a polymethylene polyphenyl isocyanate, a modified diphenylmethane diisocyanate other than the above, and in some cases, non-aromatic polyisocyanates such as isophorone diisocyanate or hexamethylene diisocyanate, may be employed.

It is preferred that among the above three types of starting materials, the high molecular weight active hydrogen compound and the chain extender are preliminarily mixed, and this mixture and the polyisocyanate compound are mixed immediately prior to the injection. In many cases, other subsidiary starting material components in addition to the above-mentioned three starting materials, may be incorporated. As such subsidiary starting material components, a catalyst such as an organic tin compound or a tertiary amine and a foaming agent such as a halogenated hydrocarbon or water, are usually incorporated as essential components, in many cases. Further, a coloring agent such as carbon black, a ultraviolet absorber, an antioxidant, a stabilizer such as a photo stabilizer, a filler such as glass fiber, mica or wallastonite and any other optional subsidiary starting material components, may be incorporated into either one or both of the above main starting materials.

FIG. 2 shows a partial cross-sectional view of an embodiment of a mold which is closed with a bilayer glass placed therein. A bilayer glass 1 comprising an inorganic glass layer 2 and a transparent elastic plastic layer 3 is placed in a mold composed of an upper mold half 8 and a lower mold half 9. The portions 10 and 11 of the mold which are in contact with the bilayer glass 1, are usually made of an elastic material to avoid breakage of the bilayer glass and to prevent leakage of the plastic material mixture from the mold cavity 12. The mold cavity 12 is defined by the inner surface 13 of the upper mold half, the inner surface 14 of the lower mold half and the upper surface 15, the side surface 16 and the lower surface 17 of the bilayer glass. The upper surface 15 of the bilayer glass is the surface of the inorganic glass layer, the side surface 16 includes the surfaces of both the inorganic glass layer and the transparent elastic plastic layer, and the lower surface 17 is the surface of the transparent elastic plastic layer. The plastic material mixture is injected in this mold cavity 12, and reacted and cured, whereby a gasket having a cross section as shown in FIG. 1 is molded.

The process of the present invention is not restricted to the above-mentioned specific example. For instance, the portion 11 (in FIG. 2) of the lower mold half which is in contact with the transparent elastic plastic layer of the bilayer glass may not necessarily be made of an elastic material, because an adequate sealing may be provided by the transparent elastic plastic layer even if this portion 11 is not made of an elastic material.

Further, the surface of the bilayer glass other than the portions defining the mold cavity may be temporarily covered with a removable film or removable material for the protection of the surface, and such a film or material may be removed after the formation of the gasket. Particularly, the surface of the transparent elastic plastic layer of the bilayer glass is mechanically, thermally or chemically rather weak as compared with the glass surface, and therefore, this surface should preferably be protected. For instance, in FIG. 2, if the portion 11 of the lower mold half which is in contact with the transparent elastic plastic layer 3 is made of a hard material, the transparent elastic plastic layer surface may receive a scar. Even if the portion is made of an elastic material, an impression or dent may remain if the pressing pressure is large. Further, if the plastic material mixture leaks from the sealing portion, the plastic material mixture may firmly adhere and be hardened on the plastic layer surface. In any case, it is preferred that the plastic layer surface other than the marginal edge surface defining the mold cavity 12 is protected by a protective material during the molding of the gasket. The surface portion to be protected with the protective material may be in the vicinity of the mold cavity only. However, in a case where the surface of the plastic layer of the bilayer glass placed in the mold is in contact, or is likely to be in contact, with a portion of the mold half other than the portion 11 as shown in FIG. 2, it is preferred to protect the surface at such a portion. Accordingly, the entire surface of the plastic layer other than the marginal edge surface defining the mold cavity 12, may be protected by the protective material.

There is no particular restriction as to the type of the protective material. In a case where no hardness is required for the protective material, it may be a relatively soft plastic film or a thin metal film, or may be a coating film formed by a coating material capable of forming a removable coating film. On the other hand, in a case where a relatively hard protective material is required, a hard plastic sheet, a metal sheet or a glass plate, may be used as the protective material. Such a protective material must be removable from the surface of the plastic layer after the molding of the gasket. However, the protective material may be attached or adhered to the plastic layer surface with a certain strength so long as it is readily removable.

Now, the present invention will be described in further detail with reference to Examples. However, it should be understood that the present invention is by no means restricted to these specific Examples.

EXAMPLES

The following two types of bilayer glass useful for automobile windshields were prepared.

Bilayer glass A (see European Patent No. 190,700):

A cross-linked polyurethane sheet having a thickness of 0.8 mm is bonded by a thermoplastic polyurethane adhesive (the thickness of the adhesive: 0.03 mm) to the inner surface of a flexure-processed inorganic glass sheet of 1400×750×3 mm. The exposed surface of the cross-linked polyurethane is preliminarily surface-reformed by the impregnation of a poly-functional acrylic monomer, followed by ultraviolet irradiation. This cross-linked polyurethane has a self-healing property and good mechanical properties.

Bilayer glass B:

The entire surface of the cross-linked polyurethane layer of the bilayer glass A except for 20 mm of the marginal edge surface, is protected with a polyethylene terephthalate film having a thickness of 0.1 mm.

A mold having a cross-sectional shape as shown in FIG. 2 was used to form a gasket having a cross-sectional shape as shown in FIG. 1 (each piece having a thickness 10 mm, the inorganic glass surface and the transparent elastic plastic surface being covered at 20 mm inward of the edge of the bilayer glass). In this mold, the above bilayer glass A or B was placed, and the mold was closed. Then, a polyurethane material mixture having the following composition was injected into the mold cavity. Two minutes after the completion of the injection, the mold was opened to obtain a glazing product. The molding condition for the reaction injection molding and the polyurethane starting material mixture were as follows.

MOLDING CONDITION

The polyol component and the isocyanate component were subjected to impingement mixing by a reaction injection molding machine to obtain a reactive mixture. The discharge pressure by the impingement mixing was 130 kg/cm$^2$, the discharged amount was 60 kg/min., and the liquid temperature of the respective components was adjusted to a temperature of from 30° to 40° C. The mold temperature was adjusted to about 70° C., and the internal pressure of the mold cavity was about 2 kg/cm$^2$.

POLYURETHANE STARTING MATERIAL

| | Parts by weight |
|---|---|
| Polyol component: | |
| Polyoxypropyleneoxyethylenetriol having a terminal oxyethylene group content of 15% by weight and a molecular weight of about 6500 | 85 |
| Carbon black paste | 10 |
| Ethylene glycol | 5 |
| Triethylene diamine solution (DABCO 33LV) | 0.7 |
| Dibutyltin dilaurate | 0.07 |
| Trichlorofluoromethane | 7 |
| Isocyanate component: | |
| Carbodiimido-modified diphenylmethane diisocyanate (NCO content: 29%) in an amount of 1.05 times in equivalent the polyol component | |

Bilayer glass A and bilayer glass B provided with a gasket having a cross-section as shown in FIG. 1 along their four peripheral sides were obtained. In the case of the bilayer glass B, the protective material was removed after being taken out from the mold.

A commercially available primar (MS-90, manufactured by Yokohama Rubber Co., Ltd.) was applied to the bonding surface of the gasket of each glazing product thus obtained, and then each glazing product was bonded to a window frame made of steel with a commercially available one liquid type urethane adhesive (Hamatight WS-30, manufactured by Yokohama Rubber Co., Ltd.), followed by curing by maintaining it at room temperature for 1 week.

TESTS

A steel plate of 30×20 cm was bonded to the gasket of the above bilayer glass A by the above-mentioned method. On the other hand, the same steel plate was bonded to the surface of the polyurethane layer of the bilayer glass A having no gasket, with the same adhesive. After the curing of the adhesive, both samples were irradiated by a sunshine weatherometer for 1000 hours, and the respective steel plates were peeled off. In the case of the sample having the gasket, the adhesive layer underwent cohesive failure, while in the case of the sample having no gasket, interfacial peeling was observed at the interface between the inorganic glass layer and the polyurethane layer or at the interface between the polyurethane layer and the adhesive layer.

The effects of the present invention are as described above, and may be summarized as follows.

1. The bilayer glass and the window frame can thereby be bonded with high bonding strength.
2. The interface between the inorganic glass layer and the transparent plastic layer of the bilayer glass can be sealed.
3. The separation of the inorganic glass layer and the transparent plastic layer can be prevented.
4. The energy absorbing property of the bilayer glass is not hindered by the gasket.
5. Removal of the transparent plastic layer along the periphery of the bilayer glass, or removal of a hard coat on the transparent plastic layer surface, is not required.
6. No deformation or wrinkles are likely to form on the transparent plastic layer in the vicinity of the gasket.
7. It is not required to apply a coating to the glazing material to improve the adhesion between the adhesive and the glazing product or to prevent the degradation of the adhesive.
8. The outer appearance of the gasket can be improved.
9. The handling of the glazing product can be improved.

We claim:

1. A process for producing a glazing product, which comprises:

forming a bilayer glass composed of an inorganic glass layer and a self-healing transparent elastic plastic layer bonded to one side of the inorganic glass layer, said bilayer glass having a marginal edge surface formed by the marginal edge surface of the inorganic glass layer and the marginal edge surface of said plastic layer;

applying a removable protective material to at least part of the plastic layer surface not bonded to the glass layer;

placing at least the marginal edge surface of said bilayer glass within a mold cavity thereby forming a modified mold cavity in the shape of a gasket defined by said marginal edge surfaces, the surface of the inorganic layer, the protected surface of the plastic layer and the inner surface of the mold;

injecting into the modified mold cavity a plastic material mixture which is capable of rapidly reacting and curing;

allowing the plastic material to react and cure to form a gasket; and removing the protective material from said plastic layer after said gasket has formed.

2. The process according to claim 1, wherein the elastic plastic layer is a double layer structure prepared by bonding a cross-linked polyurethane layer having a self-healing property to the inorganic glass layer by an adhesive resin layer.

3. The process according to claim 2, which further comprises reforming the surface of the cross-linked polyurethane layer by impregnating the surface of the polyurethane layer with an addition polymerizable monomer and polymerizing said monomer.

4. The process according to claim 1, wherein the plastic material mixture is a mixture of materials capable of forming a polyurethane.

* * * * *